United States Patent Office 2,878,159
Patented Mar. 17, 1959

2,878,159

ALGINIC ACID PURIFICATION OF INSULIN

Johan Erik Jorpes, Viktor Mutt, Selahaddin Rastgeldi, and Johan Gunnar Boris Linden, Stockholm, Sweden, assignors, by direct and mesne assignments, to Apoteksvarucentralen Vitrum Apotekareaktiebolaget, Stockholm, Sweden No Drawing. Application January 30, 1956
Serial No. 562,041

Claims priority, application Sweden February 10, 1955

2 Claims. (Cl. 167—75)

The present invention relates to a process for obtaining the antidiabetic hormone insulin from an acid alcoholic extract of pancreas glands of animals such as the hog, cattle, and horse, without previous concentration of the alcoholic extract by distillation.

According to the invention, this is made possible by treating the alcoholic extract with a cation exchanger. Said cation exchanger may consist of a synthetic or natural, high molecular cation exchanger containing carboxylic groups, such as oxycellulose, pectic acid, alginic acid or a cation-exchange synthetic resin such as Amberlite IRC-50 (manufactured by Rohm & Haas Company). The extraction is preferably carried out with an acid in such a quantity that the final pH-value of the extract is not less than 3.

According to the present invention, not only is the advantage obtained that the concentration of the alcoholic extract by evaporation may be avoided, but also that the contaminating fat remains in the alcoholic extract.

The alcohol used may be a lower aliphatic alcohol such as methanol or ethanol in a concentration mentioned as customary for this purpose in the literature (Fisher, A. M., Scott, D. A., J. Biol. Chem. 1934, 106, 305, and Jephcott, C. M., Trans. Roy. Soc. Canad. Sect. 1931, vol. 25). The pH-value is as mentioned above, not less than 3, and the acidity thus somewhat weaker than hitherto employed, and is obtained by adding to the alcohol a smaller quantity of an inorganic acid, such as hydrochloric or sulfuric acid, or an organic acid, such as acetic, citric or oxalic acid. While according to earlier methods 35-60 ml. of concentrated hydrochloric acid were added per kg. gland, 16-20 ml. of concentrated hydrochloric acid are added according to the present invention. When using acetic acid about 40 ml. are added per kg. of gland. The extraction of the frozen minced glands is carried out at room temperature for 4–5 hours.

Centrifugation and filtration of the gland material are effected more easily so that a clear extract is obtained if the alcohol is acidified with an organic acid, such as acetic acid, citric or oxalic acid.

Prior to the treatment with the carboxylic acid type cation exchanger, aqueous ammonia is preferably added to the extract to neutral or weakly alkaline reaction in order to precipitate protein impurities and neutral salts. When using certain organic acids, a considerable quantity of the acid is eliminated as an ammonium salt insoluble in 70% alcohol.

In order to eliminate the remaining ammonium ions and avoid the formation of salts when adjusting the acid reaction necessary for the adsorption or concentration of the crude insulin upon the carboxylic acid type cation exchanger, the alcoholic extract is treated, preferably in steps, with a sulfonated highly cross linked cation exchanger of the type Dowex 50 (a high capacity cross-linked polystyrene copolymer type manufactured by Dow Chemical Company) in such a quantity that a pH-value of about 3 is obtained.

By these procedures the concentration of the insulin onto the carboxylic ion exchanger is facilitated so that a considerably better yield of insulin is obtained and a smaller quantity of carboxylic ion exchanger can be used.

An aqueous suspension of alginic acid in a quantity of 40–60 g. alginic acid per kg. pancreas has proved to be the preferred ion exchanger. The concentration of the insulin onto the cation exchanger is carried out at room temperature for 2 hours. A prior removing of fat and proteins by cooling down the extract to —5° C. and centrifugation facilitates the concentration of the insulin onto the cation exchanger.

The carboxylic ion exchanger is collected upon a suction filter and the insulin is eluted with a dilute mineral acid, such as sulfuric acid or hydrochloric acid. If alginic acid is used as cation exchanger, the elution may take place at room temperature using about 100 ml. of 0.3 N hydrochloric acid per 10 g. of alginic acid. The insulin is precipitated from the eluate by saturation with sodium chloride and thereafter the precipitate obtained is subjected to further purification according to conventional methods.

Example 1

*Extraction.*—1 kg. of calf pancreas is ground into two liters of 95% ethyl alcohol containing 200 ml. of water and 12 ml. of concentrated hydrochloric acid (density 1.19). The extraction is carried out at room temperature for four hours while stirring. The residue of the glands is separated by centrifugation and the liquid is clear filtered upon a suction filter after addition of a small quantity of Hyflo-Supercel (diatomaceous earth). The pH-value of the solution is 4.8.

A further extraction of the residue of the glands is then carried out in 1.5 liters of 70% ethyl alcohol containing 4 ml. of concentrated hydrochloric acid while stirring for 1 hour and thereafter centrifugation and clear filtration take place. The filtrates are combined. The total volume is 3300 ml. and the pH-value is 4.7.

*Concentration onto the ion exchanger and elution.*— The ion exchanger used is alginic acid washed with 0.2 N hydrochloric acid and repeatedly with distilled water and dried with alcohol. 60 g. of the dry powder suspended in distilled water are added to the extract while stirring for two hours at room temperature. The alginic acid is collected upon a suction filter whereupon elution takes place with a total amount of 600 ml. of 0.3 N hydrochloric acid while stirring for 20 minutes at room temperature.

To the hydrochloric acid eluate, sodium chloride is added to saturation for precipitation of the insulin.

Example 2

*Extraction.*—1 kg. of horse pancreas is ground into 2 liters of 95% ethyl alcohol containing 200 ml. of water and 40 ml. of glacial acetic acid. The extraction is carried out at room temperature for 4 hours while stirring. The residue of the glands is separated by centrifugation or filtration after pressing against gauze. The pH-value is about 4.8.

The residue of the glands is re-extracted for one hour in 1.5 liters of 70% ethyl alcohol containing 5 ml. of glacial acetic acid, whereupon centrifugation or filtration takes place. The filtrates are combined. The pH-value of the combined filtrates is about 4.8. The extract obtained is cooled to —5° C. and the precipitate is separated by filtration by means of a small quantity of Hyflo-Supercel. The total volume amounts to about 3300 ml.

*Concentration onto the ion exchanger and elution.*— The cation exchanger used is alginic acid which has been washed with 0.2 N hydrochloric acid and repeated times with distilled water and thereafter dried with alcohol. 60 g. of the dry powder are suspended in water and added to the extract and stirring is effected for 2 hours at room temperature. The alginic acid is collected upon a suction filter. Elution is carried out with about 600 ml. of 0.3 N hydrochloric acid while stirring for 20 minutes.

The insulin in the eluate is precipitated by addition of sodium chloride to saturation.

*Example 3*

*Extraction.*—5 kg. calf pancreas or cattle pancreas are ground into 9 liters of 95% ethyl alcohol containing 1 liter of water and 375 g. of citric acid or 150 g. of oxalic acid ($H_2C_2O_4.2H_2O$) dissolved in 1 liter of water. The mixture is stirred for 5 hours at room temperature and is then screened through a fabric. The gland material is re-extracted with 7500 ml. of 70% ethyl alcohol and then screened through a fabric. The two extracts are combined. The pH-value of the solution is about 3.4.

*Purification of the extracts.*—Aqueous ammonia is added to the combined extracts to a pH-value of 8.5 and the precipitate formed is filtered off. The excess of ammonium ions is removed by addition, while stirring, of a sulfonated cation exchanger having high cross-linking, such as Dowex 50 in the hydrogen form, in a quantity giving a final pH of about 3.

*Concentration onto the ion exchanger and elution.*— The sulfonated ion exchanger is removed and washed with 70% ethyl alcohol. To the extract and the washing water are added 75 g. of wet alginic acid washed with hydrochloric acid and with water. The concentration onto the carboxylic ion exchanger is carried out while stirring at room temperature over the night. The alginic acid is allowed to sediment and is separated upon a suction funnel. It is then collected upon a filter, washed with 95% ethyl alcohol and ether and is aerated to remove the ether. A further concentration onto the same quantity of alginic acid is effected. The precipitates of alginic acid are eluted separately each with 1 liter of 0.3 N hydrochloric acid while stirring for 2–3 hours at room temperature. The eluates are combined and the insulin is precipitated with sodium chloride.

The insulin is then purified according to conventional procedures.

What we claim is:

1. In a process for obtaining insulin from pancreas glands comprising extracting crude insulin from said glands with a lower aliphatic alcohol acidified with an acid selected from the group consisting of hydrochloric, sulfuric, acetic, citric and oxalic acids, the steps comprising contacting the alcoholic extract with alginic acid to remove the insulin from the extract and eluting the insulin from the alginic acid with a dilute mineral acid selected from the group consisting of hydrochloric and sulphuric acid.

2. The process of claim 1 wherein the alcoholic extract prior to treatment with the alginic acid is neutralized with aqueous ammonia to precipitate neutral salts and protein impurities followed by treatment with a sulfonated highly cross linked cation exchanger until a pH of about 3 is obtained.

References Cited in the file of this patent

UNITED STATES PATENTS

| | | |
|---|---|---|
| 2,674,560 | Maxwell et al. | Apr. 6, 1954 |
| 2,695,861 | Maxwell et al. | Nov. 30, 1954 |

FOREIGN PATENTS

| | | |
|---|---|---|
| 497,147 | Canada | Oct. 27, 1953 |

OTHER REFERENCES

Jensen: "Insulin, Its Chem. and Physiology," The Commonwealth Fund, N. Y., 1938, p. 28.

Winters: "A New Unit Operation for the Drug Mfgr.," Rohm and Haas Co. (6 pp.), reprint from Drug and Allied Ind., July 1950.

Manuf. Chemist and Manuf. Perf., XX: 1, January 1949, pp. 10–15.

Romans et al.: I. and E. Chem. 32: 7, July 1940, pp. 908–910.